United States Patent [19]
Arndt

[11] 3,873,751
[45]* Mar. 25, 1975

[54] PREPARATION OF A SIMULATED MILK PRODUCT

[75] Inventor: Robert H. Arndt, Red Wing, Minn.

[73] Assignee: Ralston Purina Company, St. Louis, Mo.

[ * ] Notice: The portion of the term of this patent subsequent to Feb. 15, 1989, has been disclaimed.

[22] Filed: Feb. 11, 1972

[21] Appl. No.: 225,611

Related U.S. Application Data

[63] Continuation-in-part of Ser. No. 642,676, June 1, 1967, Pat. No. 3,642,492.

[52] U.S. Cl............. 426/356, 426/358, 426/365, 426/373, 426/471, 426/487, 426/520, 426/522
[51] Int. Cl............................................. A23c 11/00
[58] Field of Search.................. 79/64, 98, 17, 14; 426/356, 520, 522, 364, 487, 488, 492, 373, 358, 471

[56] References Cited
UNITED STATES PATENTS
2,555,514  6/1951  Sharp et al........................ 426/186
3,642,490  2/1972  Hawley et al.................. 426/520 X
3,642,492  2/1973  Arndt..................................... 99/64

OTHER PUBLICATIONS

Guy et al., Spray–Dried Cheese Whey–Soy Flour Mixtures, J. Dairy Science, Vol. 52, No. 4, 1969 (pp. 432–438) SF221J8.

*Primary Examiner*—David M. Naff
*Attorney, Agent, or Firm*—W. Dennis Drehkoff; Lawrence J. Hurst

[57]  ABSTRACT

A simulated milk product is prepared by forming a mixture of sweet whey and vegetable protein, controlling the pH of the mixture within the range of 5.8 to 7.5, heating the mixture to 220°F to 400°F and subjecting the mixture to a vapor flash treatment to remove objectionable flavors and odors. The product is preferably flash dried to a powder and may be used as a substitute for dry skim milk.

10 Claims, No Drawings

PREPARATION OF A SIMULATED MILK PRODUCT

BACKGROUND OF THE INVENTION

This application is a continuation-in-part application of my copending application Ser. No. 642,676 filed June 1, 1967 now U.S. Pat. No. 3,642,492.

This invention relates to a food product and a method of making such, and more particularly to a unique food product substitute for milk as a food additive or ingredient, and to a special method of preparing a unique substitute food product for dry milk, while being particularly nutritious and capable of production at a relatively low cost.

Even in countries having a relatively plentiful supply of dairy products, the cost of such has constantly increased to an extent where the purchase of dry milk products as an additive for other food products has almost become prohibitive. Consequently, substitutes for dry milk products have been made from other lower cost milk derivatives. However, the cost of these is also steadily increasing. Further, in many countries, dairy products are not plentiful, while vegetable products such as soybeans, safflower seeds, sesame seeds, peanuts, flax seeds, cotton seeds or the like, are readily grown and plentiful. Moreover, since products like soybeans are largely used for extraction of oil, the remaining by-products that are rich in protein are readily available but generally unexploited as food.

The problem is that no totally acceptable manner of treating such vegetable materials or combining them with supplemental materials have been developed that would render the final product freely interchangeable with dry milk products as a food additive or as dry skim milk. objectionable flavor is a serious problem. Ineffective moisture retention properties, among others, is another problem, particularly as an additive to products such as bread dough. Unattractive color and appearance is still another problem.

Thus, in spite of the fact that substitutes for skim milk have been proposed over the last several decades, none has really been very acceptable to the food industry or to the public, and none has really been commercially successful. Still the definite need for an economical acceptable substitute for dry milk products exists.

SUMMARY OF THE INVENTION

The novel method centers around the basic steps of blending sweet dairy whey and an isolated, vegetable protein, preferably isolated soy protein in controlled ratios, adjusting the pH of the mixture to about neutral, heating to a high temperature and retaining the mixture at the elevated temperature for a predetermined period of time and thereafter subjecting the mixture to a high degree of atomization while releasing the pressure thereon to remove objectionable flavors and odors and drying the material to a powder. Important specific details of the novel product and process are spelled out hereinafter.

DESCRIPTION OF THE PREFERRED EMBODIMENTS

The novel concept involves a special heat and pressure treatment of a misture of whey and isolated non-animal protein, such as isolated vegetable proteins preferably isolated soy protein but including those from peanuts, sesame seeds, sunflower seeds, flax seeds, cotton seeds, and the like. Isolated soy protein is the preferably ingredient as most of the development work for this invention has ben conducted using soy material.

The product employs isolated vegetable protein resulting from certain preliminary separation oerations. These operations will be described with respect to soybean and edible soy protein products because this was the major area of concern for which the invention was developed, and because the invention is particularly suited to the use of soybean materials.

The soybean meal or flakes resulting from oil extraction contains many ingredients including complex proteins, sugars, fibers, and others. The proteins and sugars are dissolved out of the solids by adding the flakes to an aqueous bath and adding a food grade alkaline material to raise the pH substantially above 7. Typical of such alkaline reagents are sodium hydroxide, potassium hydroxide, calcium hydroxide, magnesium hydroxide or other commonly accepted food grade alkaline reagents. The material is then slurried for a period of time sufficient to put the proteins into a fine stable colloidal suspension and soluble soy components into solution, usually about 30 minutes or so. The resulting liquor solution is separated from the solids, as by passing the material through a screen and/or centrifuging. Preferably, the liquor is then cycled through a clarifier to remove tiny cellular particles.

The soy proteins are then precipitated from the liquor by lowering the pH to an acidic value near or at the isoelectric point of the protein, usually a pH of 4.6 – 4.9, with the addition of a common food grade acidic reagent such as acetic acid, hydrochloric acid, phosphoric acid, citric acid, tartaric acid, or others. The precipitate is then separated as by centrifuging, and washed with water to substantially remove occluded sugars, except for a small amount of sugar which is practically impossible to remove. The precipitate is then made into an aqueous suspension or slurry with the whey by adding water to the precipitate and mixing with dry whey, or the precipitate may be sprayed dried and blended with the liquid sweet dairy whey, or the precipitate may be added directly to the liquid whey. Of course, other methods may be used for forming the desired suspension or slurry of isolated soy protein material and whey.

The sweet dairy whey is obtained as a by-product from dairy operations such as production of sweet dairy cheese, e.g. cheddar cheese. It is subjected to a heating operation prior to the blending with the other materials. This type of treatment of dairy products such as whey is known, and usually involves heating of the whey in an aqueous liquid at temperatures in the range of about 220° – 260° F. (at least about 200° F.) for a short period of time to concentrate the whey and which may be controlled to heat denature the protein of the whey or not heat denature the protein depending on the operator's preference and the end product desired. A significant point to note is that this treatment of the whey is done prior to mixing with the vegetable protein material. The whey material is preferably treated in conventional low pressure dairy concentrating equipment, which is well known in the art.

The whey as discharged from the evaporator is then in the form of a concentrate and may be formed into the desired slurry as previously discussed. Desirably the soy protein materials is added directly to the concentrated whey. If the whey has previously been dried and is in powder form, when added to a slurry of soy protein material, the combined product should be heated to about 140° F. to assure complete dissolving of the whey in water.

The combination of the two ingredients should be controlled so that the final artificial milk product will have a protein content of between about 17% and 55% on a dry weight basis. Thus, since normal sweet dairy whey has approximately 12% protein; the whey will be present in an amount of about 94 – 48% and the isolated soy protein in an amount of about 6 – 52% by weight and preferably, the isolated soy protein will be about 11 – 25% by weight and the whey will be present in an amount of about 84 – 75% by weight.

The mixture or slurry is put into a proper suspension form by adjusting the pH to a generally neutral range of about 5.8 – 7.5 and preferably 6.2 – 6.9, with the addition of an edible, food grade alkaline reagent, preferably sodium hydroxide, potassium hydroxide, magnesium hydroxide, calcium hydroxide, or mixtures thereof. This adjustment of the pH may be accomplished either by adjusting the pH of the isolated soy protein prior to the blending with the whey or by adjusting the pH of the mixture during or after blending.

The suspension to be further processed should have a controlled solids content of about 3 – 50% by weight, and preferably about 5 – 45% by weight. If it falls below about 3%, subsequent processing steps are not economically advisable when a continuous process is employed. Drying is particularly costly. Above about 50% solids content, the increase in viscosity of the suspension makes further processing difficult. The solids content which may be conveniently processed will depend on the ratio of soy protein and whey present in the product, but generally the greater the amount of soy utilized, the lower the solids content must be.

This suspension may then be subjected to a physico-thermo-vapor flash treatment including dynamic, practically instantaneous heating to a controlled elevated temperature range, and dynamic physical working, both preferably performed almost simultaneously. Currently, the most satisfactory way of achieving this is to pass the suspension at high velocity through a device commonly known as a Jet Cooker. It includes adjacent jet nozzle orifices, normally concentric, through which the suspension and the pressurized steam used as a heating agent are ejected at high velocities in intersecting flow patterns. Each tiny bit of suspension is instantly dynamically heated by the steam while practically simultaneously being subjected to severe physical forces at the nozzle and by the impacting steam. The physical working of each tiny portion is believed to molecularly expose to further action, certain obnoxious substances held to the twisted protein molecules, and this physical working with the elevated temperature heat treatment is believed to weaken and/or break the tenacious bond between these noxious substances and the complex protein molecules to an extent where these substances can be laded away by flashed off vapors, as described hereinafter. The temperature range to which the suspension is heated for the desired results is about 220° – 400° F., although the temperature should not be in the lower region of this range unless the product is subsequently vented into a vacuum chamber after being held under pressure in a special holding chamber after being held under pressure in a special holding chamber explained hereinafter. Normally the temperature should be about 285° – 320° F. for best results.

The product is introduced to the jet cooker nozzle at a positive pressure. This pressure should be at a value near the pressure of the steam injected into the suspension, should be sufficient to cause high velocity discharge of the slurry through the jet nozzle, and must be greater than the pressure in a pressure retention chamber positioned immediately downstream of the nozzle. Normally the steam pressure is about 80 – 85 psig, with the suspension line pressure being substantially the same as the steam pressure, when the injection occurs, and the discharge pressure in the chamber downstream of the nozzle is normally about 75 – 80 psig. The pressure drop of the slurry across the nozzle is about 5 – 15 psi, depending upon these other pressures, with 6 – 10 psi being common.

The time interval of the suspension in the nozzle is estimated to be about one second or less. The nozzle orifice for the slurry is small, being only a fraction of an inch, e.g., about one-eighth inch, so that the suspension solids are subjected to severe dynamic, physical, stresses or working during passage. The steam intermixes intimately with the material in the ejected suspension. The amount of steam required is not great, normally being an amount which lowers the solids content of the suspension only about 1 –3% by weight.

Preferably the nozzle orifices are concentric, with the suspension being ejected from the center orifice, for example, and the steam from a surrounding annular orifice oriented to cause its output flow path to intersect the output flow path of the center orifice. The suspension and steam could be ejected from the alternate orifices however. Further, the adjacent orifices need not necessarily be concentric to obtain this interaction.

As noted previously, the steam and suspension are ejected into a special retention chamber. This may comprise an elongated tube through which the intermixed suspension and steam moves from the jet nozzle on one end of the tube to a pressure controlled discharge on the other end. The size and configuration of this chamber are not really critical. The discharge can be controlled by a conventional pre-set pressure release valve to enable continuous process flow from the nozzle to and out of the discharge valve. This valve regulates the pressure in the holding chamber. The pressure in this chamber must be great enough to prevent any significant vaporization of the moisture in the chamber, even though the temperature is well above the boiling point of water. A pressure of about 75 – 80 psig readily achieves this. Since the suspension and steam must continuously flow into this pressurized chamber, the pressure behind the suspension and the steam must be greater than the chamber pressure to cause this continuous flow.

The heated suspension is retained in the holding chamber for a definite but relatively short time period of a few seconds up to a few minutes, normally of about 7 seconds to about 100 seconds. It is only necessary to retain the product in this heated condition for a few seconds for optimum results. The time is not too critical in this range, although the longer the suspension is held, the greater the likelihood of the discoloration or browning of the product with subsequent release of pressure, particularly at higher temperatures of treatment.

The pressure on the suspension is then instantly released by discharging the suspension to a reduced pressure zone, into a suitable receiving means that is normally at or near atmospheric pressure or below. This discharging operation is normally progressive for the suspension that passes progressively through the chamber. This discharge and sudden pressure release causes "flash off" of a portion of the moisture in the form of water vapor which is laden with the entrained odiferous, obnoxious, characteristic, pungent chemical components or substances of unknown composition from the soy product. The flash off also causes substantial cooling of the remaining suspension because of the heat of vaporization absorbed from the suspension, so that the total time for which the product is subjected to elevated temperatures is actually very short and controlled. Removal of the substance-laden vapors from the product removes the objectionable flavor and odor characteristics.

This special treatment of the vegetable protein and whey mixture not only removes objectionable odor and flavor, but also importantly causes retention in the product of the property of high dispersibility in water possessed by the raw material. In fact, the dispersibility usually decreases only a few percent. Conventional treatments of such materials normally lowers dispersibility down to values of about 20% or so. If the final product is to be used in baking bread or in other products where moisture binding capacity is important, the vegetable protein is preferably subjected to drying and reliquifying prior to the blending with whey and this physicothermo-vapor flash treatment as noted previously. This added drying and reliquification lowers dispersbility several percent while still keeping it relatively high, e.g., about 75%, and also increases water binding capacity considerably. This latter factor is significant to bakery products since it strongly affects tenderness and other characteristics of the baked product. The complete technical explanation of this change is not fully understood, but the difference in properties does exist.

The reduce pressure zone into which the suspension is dischared is preferably a partical vacuum but may also be at atmospheric pressure. This is effective in reducing the temperature of the product very rapidly. In either case, the vapors should be instantly conducted away from the suspension, preferably by moving a current of air across the suspension or by drawing a continuous vacuum on the discharge zone to draw the vapors away. The vapors may be specially condensed in a fashion to positively remove the condensate from the area of the collected discharged suspension. In production, the suspension may be discharged from the back pressure control discharge valve directly into a vessel in the open atmosphere where the vapors are allowed and/or caused to rise directly away from the suspension and are prevented from condensing in a manner to allow the condensed substance to flow back into the product. To assure complete removal of the vapors from the purified suspension without allowing the vapors to recondense back into the suspension, the suspension and vapor should be separated from each other immediately after discharge, i.e., immediately after pressure release. In this regard, it is undesirable to cause passage of both components through a common conduit downstream of the discharge valve, and if such is done, it should be minimal.

The resulting purified slurry is whitish and attractive in appearance. This purified suspension should then have a maximum solids content of about 50% by weight, depending on the ratio of soy isolate to whey, since a higher solids content creates difficulty in subsequent processing due to high viscosity. It should be noted that as a general rule, the higher the isolate soy protein material in the product the lower the solids content should be for convenient processing. Such a suspension is actually a dispersion in the nature of a solution-suspension, part of the solids being in solution and part in suspension.

As an alternative the whey and protein isolate mixture may be subjected to a heat treatment, such as in a spiratherm heater, without the severe mechanical working during the heating, followed by the holding or retention step, as previously discussed, and thereafter the mixture would be subjected to severe atomization to achieve sufficient physical working or exposure of the surfaces of the particles to remove the undesirable flavor and odor causing characteristics from the mixture. The heating in the spiratherm would be to a temperature in the range of 220° – 400° F. and preferably 285° – 320° F. with the mixture being held at this temperature for a brief period of time, normally about 7 seconds to about 100 seconds. Thereafter, when the pressure on the slurry is released, the slurry is subjected to a high degree of atomization in order to obtain sufficient physical working, streeses, or exposure of the surfaces of the particles of the slurry to cause flash off vaporization of vapor laden with substances that possess undesirable flavor and odor characteristics. As noted previously, it is then important that the vapors be conducted away from the slurry to prevent the vapors from recondensing back into the slurry. The resulting purified slurry is whitish and attractive in appearance and is substantially identical to the material treated by the jet cooker heat treatment.

The pH of the material at this point may then be adjusted to the desired pH within the range of 5.8 – 7.5, and preferably 6.2 – 6.9. If necessary, this is done by adding a food grade alkaline reagent, the preferred reagent being sodium hydroxide, although calcium hydroxide, magnesium hydroxide, potassium hydroxide, other common food neutralizing agents and the like or a mixture of any of these will serve the purpose. The material is then dried, preferably by flash drying, e.g., using a spray dryer, to obtain a powder having a moisture content of about 3% or so.

This final product may be used as a substitute for dry skim milk in producing or preparing other food products. It has an attractive appearance like that of dry skim milk. It has no noticeable flavor or odor characteristic of soy. It tastes bland and sweet, like dried skim milk. Its functional characteristics render it an excellent ingredient for adding to foods. Its dispersibility in aqueous liquids is high, i.e., at least about 75%. It has good water binding capacity. The product has excellent qualities for a substitute for skim milk in bakery dough, particularly bread, especially when its water binding capacity is increased by the drying and reliquification steps of the isolated neutral soy protein prior to the dynamic physico-thermo-vapor flash treatment.

Extensive testing has shown that bread dough prepared with the novel product is comparable to that prepared with non-fat dry milk, (i.e., skim milk) at normal levels, e.g., 2% and 4% of the dough. The baked bread has an aroma and a toasting quality comparable to that containing milk, has greater water absorption properties to result in more tender bread, and has a shorter necessary fermentation time. No characteristic soy flavor or the like is detectible. The product has a high nutritional content. Another important factor is that 33% less of the novel product need be added to the dough to give results equal to or better than when dry skim milk is used.

Basically, therefore, the product exhibits all of the necessary characteristics to serve as an excellent substitute for dry skim milk as a food additive for bakery products, candy products, ice cream type products, and many others.

The basic principles of the novel product and process set forth above will enable anyone having ordinary skill in the art to practice the invention, and if desired, to make controlled variations within the concept. To assure a complete understanding of the invention, the following illustrative examples are set forth.

EXAMPLE 1

A. If raw soybeans are the starting material, the soybeans are flaked and the oil extracted with hexane to give defatted flakes which when ground are called soybean meal.

B. The flakes or meal are added to an aqueous bath and a food grade alkaline reagent, sodium hydroxide, is added until a pH of 10 is reached. The material is slurried for 30 minutes, and then centrifuged. The soy protein material is precipitated from the liquor by adding acetic acid until the isoelectric point is reached at a pH of about 4.7. Normally, this precipitate is about 90 – 95% protein. The precipitate is washed with water. These preliminary processing steps are generally known.

C. The precipitate is then added to water to make an aqueous slurry. The pH of the aqueous slurry is adjusted up to 6.6 with sodium hydroxide to form a colloidal suspension. Sweet dairy whey obtained as a by-product from cheddar cheese manufacturing is then blended into the slurry. The soy isolate in the slurry is about 6% and the whey about 94% with the solids content of the slurry suspension being 15%.

D. The suspension is then passed through a jet cooker under a pressure of 85 psig, simultaneously with steam ejection from the jet cooker under a pressure of 75 psig. The steam heats the suspension almost instantaneously, e.g., in about one second, to a temperature of 310° F. The heated suspension is held for seven seconds under the elevated pressure which is high enough to prevent vaporization at that temperature, and then progressive portions of the heated suspension are discharged into a receiver at atmospheric pressure or below, causing flash off of vapors laden with obnoxious smelling and tasting substances. The suspension is cooled by the flash off vaporization. The substance laden vapors are removed from the purified product. The product is flash dried in a spray dryer to a moisture content of 3% to result in a whitish simulated milk product which may be put into containers for use in food products.

EXAMPLE 2

In step C of Example 1, the soy precipitate was previously spray dried and the slurry or suspension was formed by mixing the dried soy isolate with liquid whey.

EXAMPLE 3

Prior to spray drying the suspension, calcium hydroxide is added and blended with the suspension until the pH is 6.7.

EXAMPLE 4

A. – C. A suspension like that in Step C of Example 1 is used, assuming that the preliminary Steps A and B have been performed and with the pH being raised in Step C to 6.8 with a mixture of sodium hydroxide and calcium hydroxide. The suspension is 17% solids and the soy isolate in the slurry is about 52% and the whey about 48% by weight.

D. The Step D of Example 1 is performed except that the temperature is 320° F.

EXAMPLE 5

The steps in Example 1 are followed except that in Step D the slurry is passed through a high pressure pump which physically works the suspension portions and puts it under a pressure of 100 psi, and then through a restricted tube having a hot zone, while still under pressure, where the suspension is rapidly and dynamically heated to 280° F., and the suspension is then jetted into a vacuum chamber at a negative pressure of 20 inches of mercury for instant reduction of the pressure and flash off.

EXAMPLE 6

A. – B. Steps A and B of Example 1 are followed.

C. A mixture of whey and the soy isolate is formed with whey being present at about 70% by weight and soy isolate about 30% by weight. The solids content of the slurry is about 37%.

D. The mixture is then passed through a spiratherm heater to heat the mixture to a temperature of about 310° F.

E. The heated mixture is held for 7 seconds under the elevated pressure which is high enough to prevent vaporization at that temperature.

F. The heated mixture is then subjected to atomization by ejecting successive portions of the mixture through a spray nozzle which effectively physically works the product and sufficiently exposes portions thereof to permit the flash off vaporization of undesirable flavor and odor causing constituents. The vapors are removed from the purified mixture. The mixture is spray dried to a moisture content of 3% to result in a simulated milk product which may be put in containers for use in food products.

Countless additional examples could be presented using various temperatures in the noted range, various percentages of ingredients in the noted ranges, and various equipment, but this would only unduly lengthen this disclosure since those having ordinary skill in the art can readily practice this invention based upon the guidelines given and the foregoing illustrative examples.

In the light of the criteria set forth herein, this invention is intended to be limited only by the scope of the

I claim:

1. A method of preparing a simulated milk product comprising the steps of: preparing a neutralized aqueous suspension of an isolated vegetable protein ingredient and sweet dairy whey, having a solids content within the range of 3 - 50%, the isolated vegetable protein ingredient being present in an amount from about 6 - 52% by weight and the sweet dairy whey being present in an amount from about 94 - 48% by weight, controlling the pH of the suspension within the range of about 5.8 - 7.5, heating the suspension rapidly to temperatures of about 220° F. to about 400° F., and subjecting it to dynamic physical working, retaining the suspension for a brief period of time under a positive pressure sufficiently high to prevent volatilization of heated water vapor from the heated suspension, suddenly releasing the pressure to cause flash off volatilization of vapor laden with substances that possess undesirable flavor and odor characteristics, and separating the vapors from the treated suspension to form a simulated milk product.

2. The method of claim 1 including the step of drying the product to a powder.

3. The method of claimi 1 wherein the isolated vegetable protein ingredient is isolated soy protein.

4. The method of claim 3 wherein the solids content of the suspension is within the range of 5 - 45% and said heating is to a temperature in the range of 285° - 320° F. with said suspension being retained under pressure for about 7 seconds to about 100 seconds prior to the pressure release.

5. The method of claim 4 wherein the isolated soy protein is present in an amount from about 11 - 25% and the sweet dairy whey being present in an amount from about 89 - 75%.

6. A method of preparing a simulated milk product comprising the steps of: preparing a suspension of isolated soy protein and sweet dairy whey, having a solids content within the range of 3 - 50%, the isolated soy protein being present in an amount from about 6 - 52% by weight and the sweet dairy whey being present in an amount from 94 - 48% by weight, controlling the pH of the suspension within the range of 5.8 to 7.5, heating the suspension in a heater to a temperature of about 220° to about 400° F., retaining the suspension at that temperature for a brief period of time under a positive pressure sufficiently high to prevent volatilization of heated water vapor from the heated suspension, suddenly releasing the pressure to cause flash off volatilization of vapor laden with substances that possess undesirable flavor and odor characteristics, subjecting the slurry to sufficient flavor and odor characteristics, subjecting the slurry to sufficient atomization during the pressure release to obtain sufficient exposure of the particles of the suspension to effect the flash off vaporization, and separating the vapors from the treated slurry to form a simulated milk product.

7. The method of a claim 6 including the step of drying the product to a powder.

8. The method of claim 7 wherein the pH of the suspension is adjusted to 6.2 - 6.9 by adding one of the food grade alkaline reagents selected from the group consisting of sodium hydroxide, calcium hydroxide, potassium hydroxide, magnesium hydroxide, and mixtures thereof following the separation of the vapors from the suspension.

9. The method of claim 6 wherein the solids content of the suspension is within the range of 5 - 45%, and the heating is to a temperature in the range of 285° - 320° F. with said suspension being retained under pressure for about 7 seconds to about 100 seconds prior to the pressure release.

10. The method of claim 9 wherein the isolated soy protein is present in an amount from about 11 - 25% and the sweet dairy whey being present in an amount from about 89 - 75%.

* * * * *

UNITED STATES PATENT OFFICE
CERTIFICATE OF CORRECTION

Patent No. 3,873,751          Dated March 25, 1975

Inventor(s) Robert H. Arndt

It is certified that error appears in the above-identified patent and that said Letters Patent are hereby corrected as shown below:

Column 1, line 65 - The word "moisture" should be inserted for "misture"

Column 2, line 3 - The word "been" should be inserted for "ben"

Column 3, line 14 - "89" should be inserted for "84"

Column 3, lines 65 and 67 - omit "after being held under pressure in a special holding chamber"

Column 5, line 42 - "discharged" should be inserted for "dischared"

Column 6, line 18 - omit the word "severe" and insert "sufficient"

Column 6, line 23 - omit the word "and"

Column 6, line 28 - omit the word "high" and insert "sufficient"

Column 10, lines 14 and 15 - omit "sufficient flavor and odor characteristics, subjecting the slurry to"

Column 10, line 20 - omit the word "a"

Signed and Sealed this twenty-third Day of September 1975

[SEAL]

Attest:

RUTH C. MASON
Attesting Officer

C. MARSHALL DANN
Commissioner of Patents and Trademarks